(12) United States Patent
Kume et al.

(10) Patent No.: US 10,059,230 B2
(45) Date of Patent: Aug. 28, 2018

(54) SEAT SLIDING DEVICE

(71) Applicant: TOYOTA BOSHOKU KABUSHIKI KAISHA, Aichi (JP)

(72) Inventors: Sho Kume, Aichi (JP); Hideki Fujisawa, Aichi (JP); Tatsuyoshi Sabuta, Aichi (JP); Takashi Kitano, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/710,145

(22) Filed: Sep. 20, 2017

(65) Prior Publication Data

US 2018/0086231 A1 Mar. 29, 2018

(30) Foreign Application Priority Data

Sep. 28, 2016 (JP) .................................. 2016-189941

(51) Int. Cl.
| | | |
|---|---|---|
| *B60N 2/00* | (2006.01) | |
| *B60N 2/07* | (2006.01) | |
| *A47C 1/12* | (2006.01) | |
| *B61D 33/00* | (2006.01) | |
| *B63B 29/06* | (2006.01) | |
| *B63B 29/04* | (2006.01) | |
| *B64D 11/06* | (2006.01) | |

(52) U.S. Cl.
CPC .............. *B60N 2/0722* (2013.01); *A47C 1/12* (2013.01); *B61D 33/0078* (2013.01); *B63B 29/06* (2013.01); *B63B 2029/043* (2013.01); *B64D 11/0696* (2013.01)

(58) Field of Classification Search
CPC ..................................................... B60N 2/0705
USPC ........................................ 248/424, 429, 430
See application file for complete search history.

(56) References Cited

U.S. PATENT DOCUMENTS

| | | | | | |
|---|---|---|---|---|---|
| 5,931,436 | A | * | 8/1999 | Rohee ................. | B60N 2/0705 248/429 |
| 6,079,688 | A | * | 6/2000 | Levillain .............. | B60N 2/0705 248/429 |
| 6,113,051 | A | * | 9/2000 | Moradell ............. | B60N 2/0705 248/430 |
| 6,126,133 | A | * | 10/2000 | Timon ................. | B60N 2/0705 248/429 |
| 6,641,104 | B2 | * | 11/2003 | Flick ................... | B60N 2/0705 248/430 |

(Continued)

FOREIGN PATENT DOCUMENTS

JP      2003-146118      5/2003

*Primary Examiner* — Steven M Marsh
(74) *Attorney, Agent, or Firm* — Greenblum & Bernstein, P.L.C.

(57) ABSTRACT

A seat sliding device that supports a seat so that the seat is slidable is provided. The seat sliding device includes a fixed rail having a first rail-surface and a second rail-surface, a movable rail that is configured to be slidable relative to the fixed rail, a roller that is mounted on the movable rail, a first rolling element that is formed into a sphere, and a first retainer that is mounted on the movable rail. The roller receives a downward load imposed on the movable rail and rolls to contact the first rail-surface. The first rolling element rolls to contact the second rail-surface. The first retainer presses the first rolling element against the second rail-surface while rotatably retaining the first rolling element.

8 Claims, 9 Drawing Sheets

(56) References Cited

U.S. PATENT DOCUMENTS

| | | | |
|---|---|---|---|
| 6,648,292 B2 * | 11/2003 | Flick .................... | B60N 2/0705 248/430 |
| 8,215,602 B2 * | 7/2012 | Walter ................. | B60N 2/0705 248/424 |

* cited by examiner

SEAT SLIDING DEVICE

CROSS-REFERENCE TO RELATED APPLICATIONS

This application claims the benefit of Japanese Patent Application No. 2016-189941 filed Sep. 28, 2016 in the Japan Patent Office, the disclosure of which is incorporated herein by reference.

BACKGROUND

The present disclosure relates to a seat sliding device that supports a seat so that the seat is slidable.

For example, Japanese Unexamined Patent Application Publication No. 2003-146118 discloses a seat sliding device, in which a rolling element such as a hard sphere and a roller is rotatably arranged in a gap between a lower rail and an upper rail.

SUMMARY

In the invention disclosed in the aforementioned publication, when the upper rail is displaced by sliding relative to a fixed lower rail towards a first end of the fixed lower rail in the longitudinal direction, the rolling element is displaced by rolling relative to the upper rail towards a second end of the upper rail in the longitudinal direction.

As a result of this, it is difficult to ensure a large slide stroke in the invention disclosed in the aforementioned publication. The slide stroke is a length of sliding-displacement of the upper rail relative to the lower rail.

It is preferable that one aspect of the present disclosure is a seat sliding device that can ensure a large slide stroke.

The present disclosure is a seat sliding device that supports a seat so that the seat is slidable. The seat sliding device comprises a fixed rail that comprises a first rail-surface facing upward, and a second rail-surface facing downward; a movable rail that is configured to be slidable relative to the fixed rail; a roller that is mounted on the movable rail; at least one first rolling element that is formed into a sphere; and a first retainer that is mounted on the movable rail. The movable rail supports the seat. The roller receives a downward load imposed on the movable rail and rolls to contact the first rail-surface. At least one first rolling element rolls to contact the second rail-surface. The first retainer presses the at least one first rolling element against the second rail-surface while rotatably retaining the at least one first rolling element.

In the present disclosure, the roller and the at least one first rolling element are thereby displaced integrally with the movable rail relative to the fixed rail. In other words, in the present disclosure, when the movable rail is displaced by sliding towards a first end of the fixed rail in the longitudinal direction, the roller and the at least one first rolling element are not displaced by rolling towards a second end of the fixed rail in the longitudinal direction relative to the movable rail.

Since the first retainer presses the at least one first rolling element against the second rail-surface, it is possible to reduce rattling of the movable rail in the up-down direction relative to the fixed rail. Accordingly, a large slide stroke can be ensured in the present disclosure while rattling of the movable rail in the up-down direction is reduced.

If "a configuration to reduce rattling of the movable rail in the up-down direction by disposing, on the second rail-surface, a sliding shoe that is in sliding-contact with (hereinafter alternatively referred to as "sliding on") the second rail-surface" is adopted, it becomes easier to increase a sliding load (static friction force) that is generated on the contiguous surfaces of the second rail-surface and the sliding shoe.

The aforementioned configuration therefore requires a large force to cause the movable rail to be displaced by sliding and may decrease sliding performance. In contrast, since rattling in the up-down direction is reduced by using a sphere-shaped rolling element in the present disclosure, a decrease in the sliding performance can be reduced.

The seat sliding device according to the present disclosure may be configured as described below.

That is, the seat sliding device may comprise a third rail-surface disposed on the fixed rail, wherein the third rail-surface is approximately orthogonal to the horizontal direction; at least one second rolling element that is formed into a sphere, wherein the at least one second rolling element rolls to contact the third rail-surface; and a second retainer that presses the at least one second rolling element against the third rail-surface while rotatably retaining the at least one second rolling element. Due to this configuration, a large slide stroke can be ensured while rattling in the horizontal direction is reduced.

The first retainer and the second retainer may be integrally formed with each other. This enables reducing an increase in the number of components and the number of steps in the assembly process.

The first retainer may retain at least two first rolling elements. The at least two first rolling elements may be arranged in a line along a direction parallel to the longitudinal direction of the second rail-surface. This enables spreading a load to two or more first rolling elements.

An imaginary horizontal line that passes through the center of the at least one second rolling element may be approximately orthogonal to the third rail-surface and to a surface of the movable rail that faces the third rail-surface across the at least one second rolling element. This assures that the fixed rail can receive a load in the horizontal direction; therefore, it is ensured that rattling in the horizontal direction can be reduced.

A portion of the first retainer, where the at least one first rolling element has a sliding-contact with the first retainer, may comprise a spherical recess. This enables a smooth rolling of the at least one first rolling element.

BRIEF DESCRIPTION OF THE DRAWINGS

Embodiments of the present disclosure will be described hereinafter by way of example with reference to the accompanying drawings, in which.

DETAILED DESCRIPTION OF THE PREFERRED EMBODIMENTS

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawings are made for easy understanding of relationship between each drawing. Arrows and other marks (directions) labelled on each drawing do not limit the scope of the present disclosure.

At least in respect of a member or portion that is labeled with a reference numeral for explanations, there is at least one in number of such a member or portion unless the number is otherwise specified, for example, as "one of". In other words, there may be two or more of such a member or portion disposed.

First Embodiment

Figure 1:
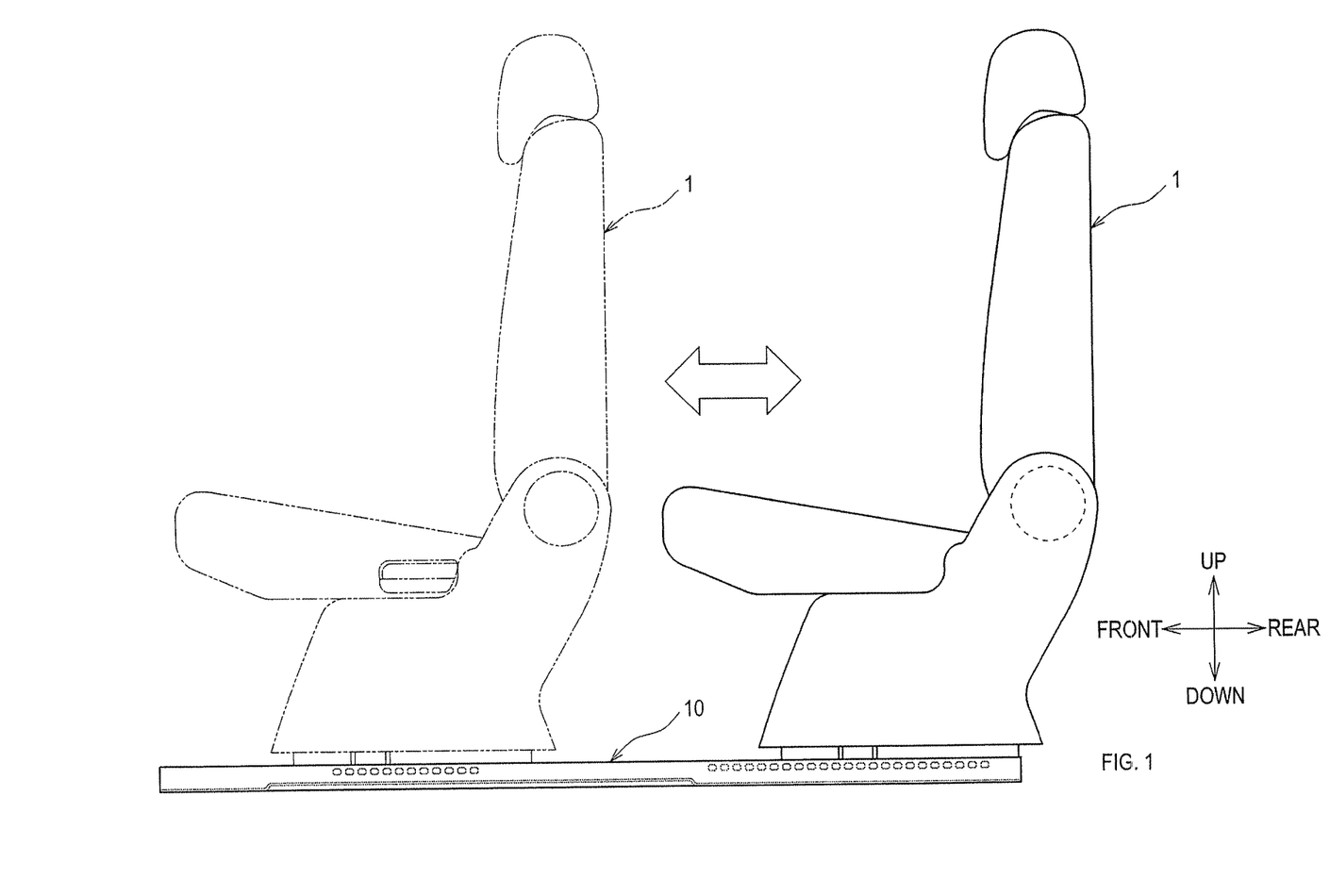
FIG. 1 is a diagram showing an installation of a seat sliding device according to embodiments of the present disclosure.

In the present embodiment, a seat sliding device 10 will be explained. The seat sliding device 10 enables a conveyance seat 1 to be slidable relative to a conveyance such as a vehicle as shown in FIG. 1. The seat sliding device 10 can cause the conveyance seat 1 to slide in the front-rear direction of the seat while supporting the conveyance seat 1.

1. Configuration of Seat Sliding Device 1.1 Schematic Configuration

Figure 2:
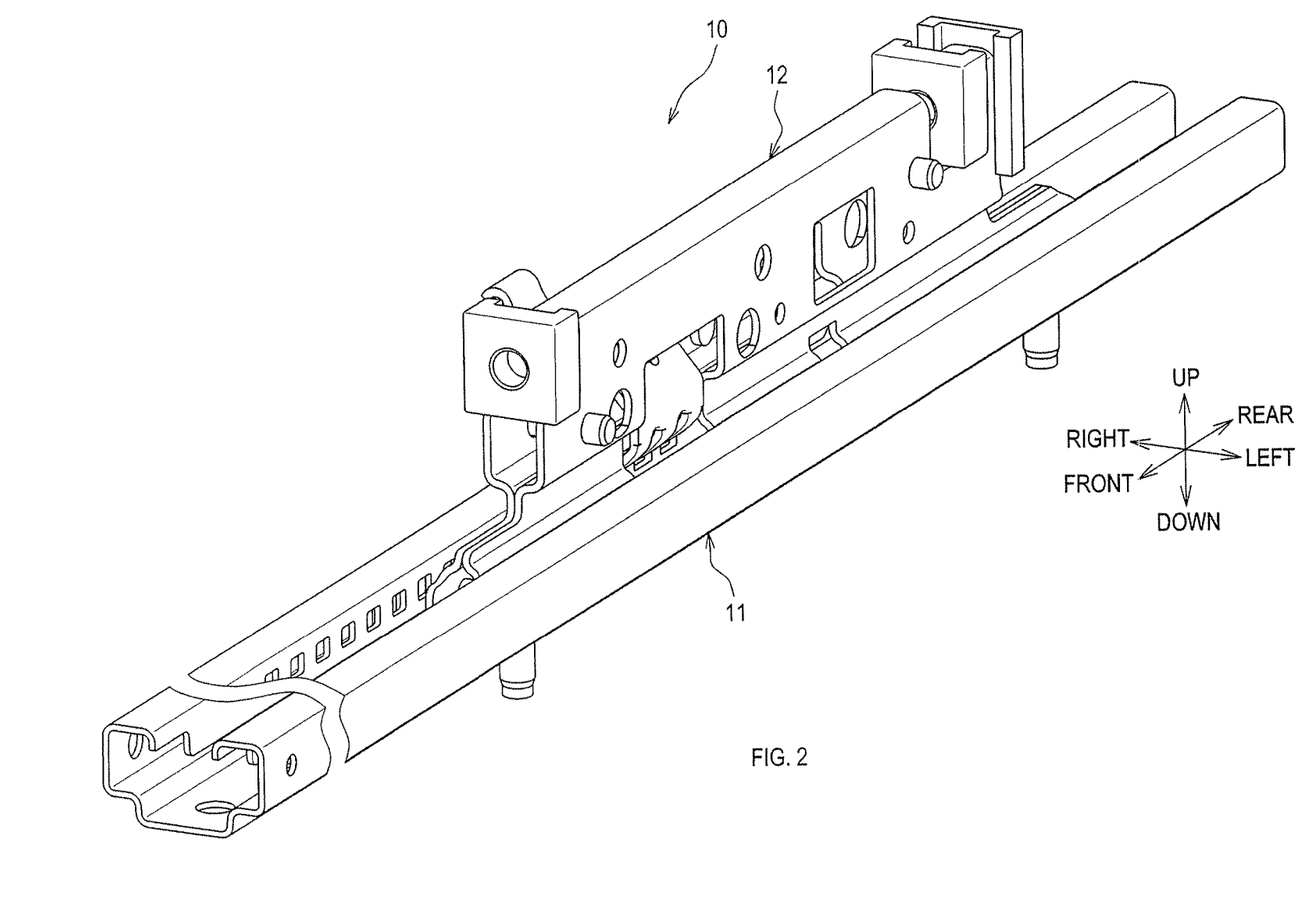
FIG. 2 is a perspective view of a seat sliding device according to a first embodiment.

As shown in FIG. 2, the seat sliding device 10 comprises at least a fixed rail 11 and a movable rail 12. The fixed rail 11 is fixed to a vehicle, for example on a floor panel. The fixed rail 11 according to the present embodiment is fixed to the vehicle such that the longitudinal direction of the fixed rail 11 matches the front-rear direction of the conveyance seat 1, and that the fixed rail 11 extends in the front-rear direction of the vehicle.

Figure 4:
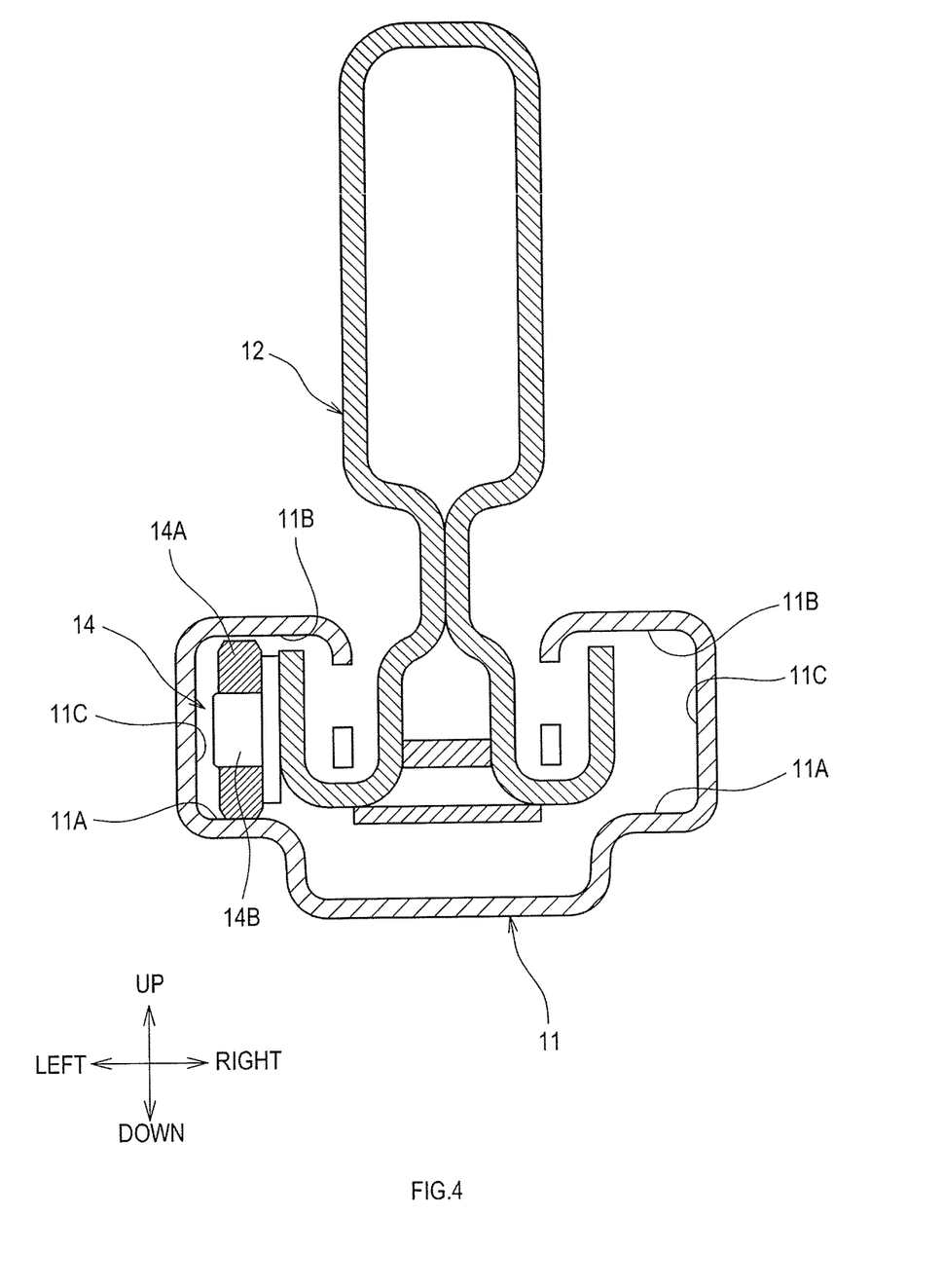
FIG. 4 is a sectional view showing the movable rail according to the first embodiment.

As shown in FIG. 4, the fixed rail 11 comprises at least one first rail-surface 11A and at least one second rail-surface 11B. The first rail-surface 11A is a band-plate surface that faces upward in the vertical direction and extends in a direction parallel to the aforementioned longitudinal direction.

The second rail-surface 11B is a hand-plate surface that faces downward in the vertical direction and extends in a direction parallel to the aforementioned longitudinal direction. In the present embodiment, the first rail-surface 11A and the second rail-surface 11B face each other in the vertical direction across a space.

The fixed rail 11 according to the present embodiment comprises a third rail-surface 11C. The third rail-surface 11C is a band-plate surface that is approximately orthogonal to the horizontal direction and extends in a direction parallel to the aforementioned longitudinal direction. The third rail-surface 11C is disposed on a wall that connects the first rail-surface 11A with the second rail-surface 11B.

In the fixed rail 11 according to the present embodiment, the first rail-surface 11A, the second rail-surface 11B, and the third rail-surface 11C are disposed on each side of the movable rail 12 at a location respectively symmetrical about the movable rail 12. That is to say that, as shown in FIG. 4, when viewed along the vertical direction that is orthogonal to the aforementioned longitudinal direction, the first rail-surface 11A and the aforementioned other surfaces on the left side of the drawing are each disposed at a location respectively symmetrical with the first rail-surface 11A and the aforementioned other surfaces on the right side of the drawing about the movable rail 12.

Hereinafter, the direction parallel to the longitudinal direction of the fixed rail 11 is referred to as a "direction of extension". And, the horizontal direction that is orthogonal to this direction of extension is referred to as a "width direction". The width direction corresponds to a seat-width direction in the present embodiment.

The movable rail 12 is a moving element that is configured to be slidable relative to the fixed rail 11 in the direction of extension and to support the conveyance seat 1. In other words, the conveyance seat 1 is coupled and fixed to the movable rail 12 and thus is enabled to translate parallel to the direction of extension with the movable rail 12.

The fixed rail 11 and the movable rail 12 are both made of metal. Thus, the first rail-surface 11A, the second rail-surface 11B, and the third rail-surface 11C are also made of metal. The first rail-surface 11A, the second rail-surface 11B, and the third rail-surface 11C are integrally formed by a plastic working such as press working on a metallic plate.

1.2 Slide-Support Mechanism

A slide-support mechanism 13 (see FIG. 3) is a mechanism for receiving a load imposed on the movable rail 12 and smoothly displacing the movable rail 12 by sliding relative to the fixed rail 11.

Figure 6A:
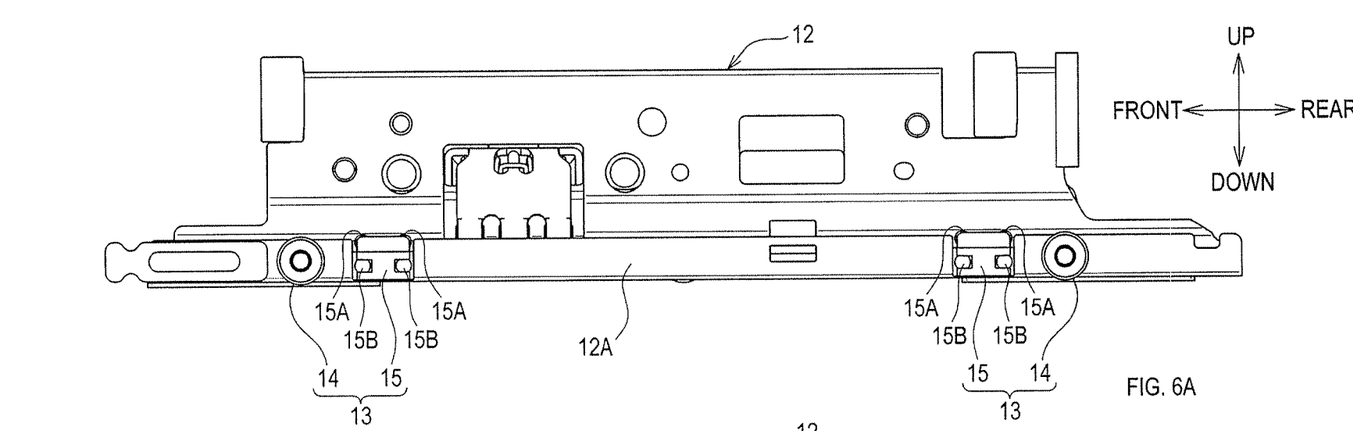
FIG. 6A shows a view on arrow A of FIG. 3.

The slide-support mechanism 13 comprises at least one roller rolling element 14, and at least one spherical rolling element 15. As shown in FIG. 6A, the movable rail 12 comprises, on its first end in the width direction, one roller rolling element 14 and one spherical rolling element 15 respectively on a first end and second end of the movable rail 12 in the direction of extension.

Figure 6B:
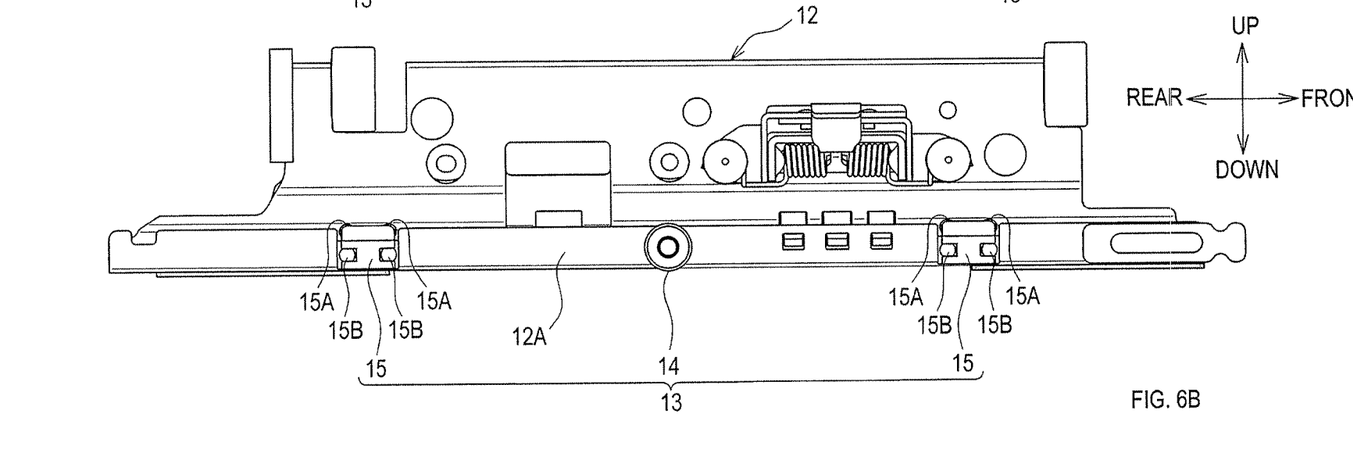
FIG. 6B shows a view on arrow B of FIG. 3.

As shown in FIG. 6B, the movable rail 12 comprises, on its second end in the width direction, one spherical rolling element 15 on each of the first end and second end of the movable rail 12 in the direction of extension. One roller rolling element 14 is disposed on the movable rail 12 at an approximately central area in the direction of extension. In other words, one movable rail 12 comprises four spherical rolling elements 15, and three roller rolling elements 14.

The spherical rolling elements 15 disposed on the first end of the movable rail 12 in the width direction and the spherical rolling elements 15 disposed on the second end of the movable rail 12 in the width direction are identically structured except that their structures are symmetric about the movable rail 12. Similarly, the roller rolling elements 14 disposed on the first end of the movable rail 12 in the width direction and the roller rolling element 14 disposed on the second end of the movable rail 12 in the width direction are identically structured except that their structures are symmetric about the movable rail 12.

1.3 Roller Rolling Element

As shown in FIG. 4, the roller rolling element 14 comprises a roller 14A, which is in a circular shape, and a shaft 14B. The roller 14A is rotatably attached to the movable rail 12 via the shaft 14B. The roller 14A is configured so as to be able to roll to contact the first rail-surface 11A when receiving a downward load imposed on the movable rail 12.

The roller 14A in the present embodiment is made of metal. The shaft 14B configures a bearing that has a sliding-contact with an inner circumferential surface of the roller 14A to rotatably support the roller 14A. The shaft 14B is fixed to the movable rail 12 by joining fixation such as welding, or by mechanical fastening such as swaging.

1.4 Spherical Rolling Element

Figure 7A:
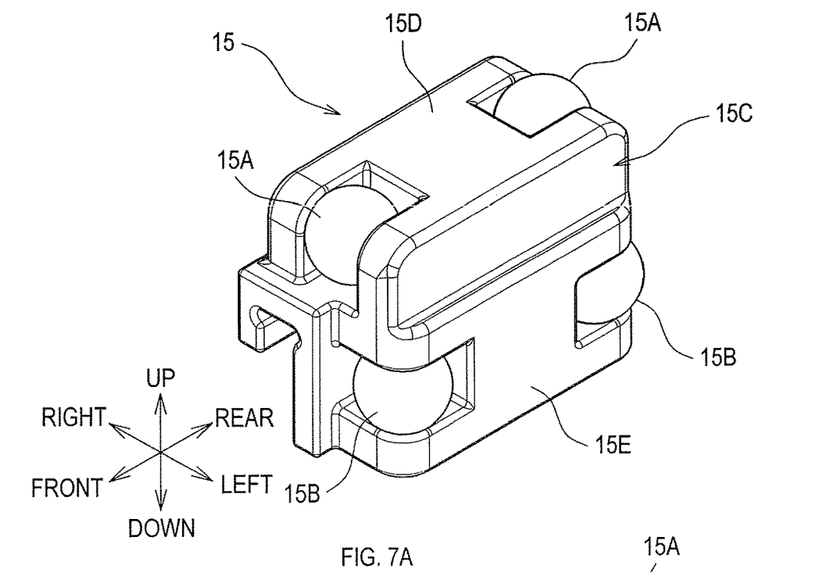
FIG. 7A is a perspective view of a spherical rolling element according to the first embodiment.

As shown in FIG. 7A, the spherical rolling element 15 comprises first rolling elements 15A, second rolling elements 15B, and a retainer 15C. Each of the first rolling elements 15A and the second rolling elements 15B is a spherically-formed rolling element.

The first rolling elements 15A and the second rolling elements 15B according to the present embodiment are metallic hard spheres. In the present embodiment, the number of the first rolling elements 15A and the second rolling elements 15B are two each.

Figure 5:
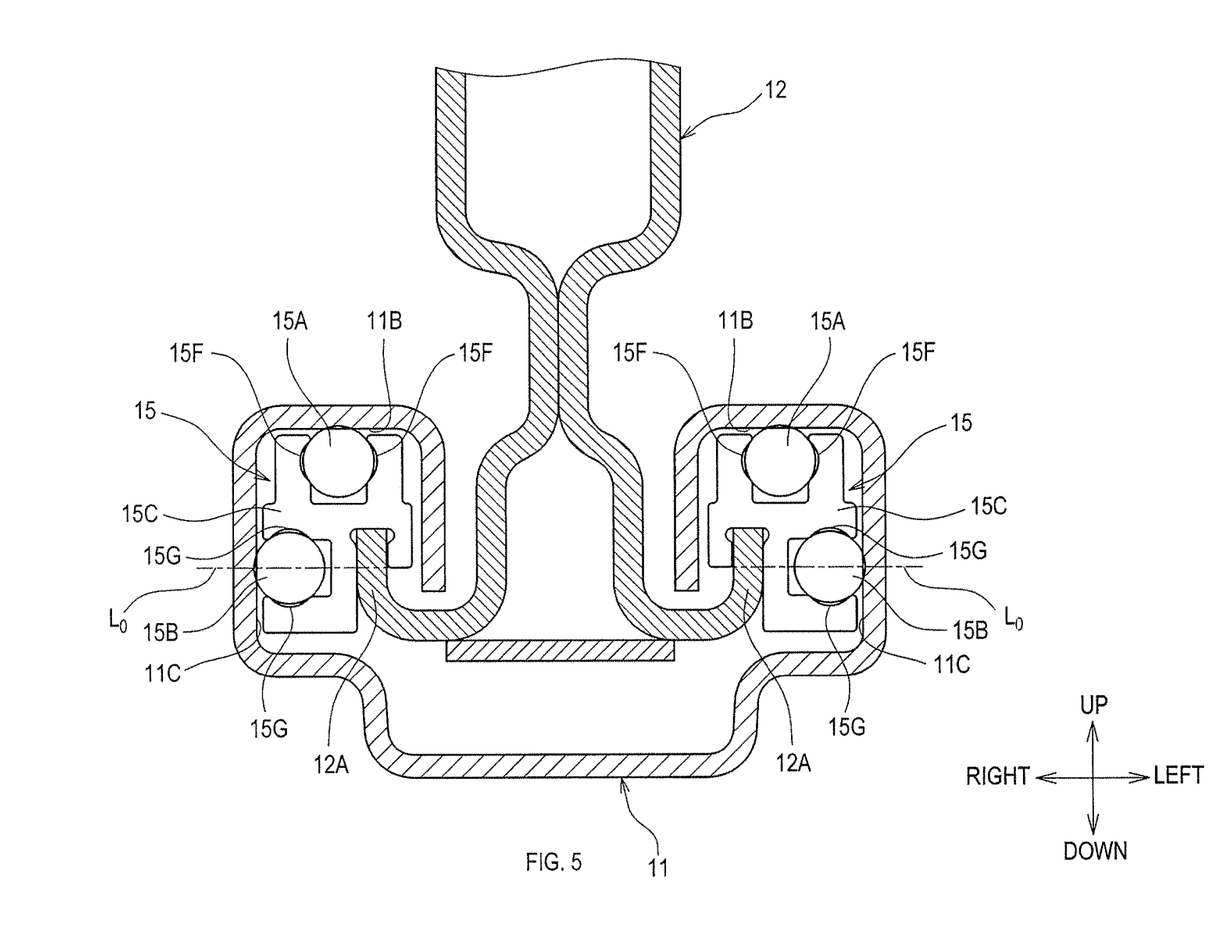
FIG. 5 is a sectional view showing the movable rail according to the first embodiment.

As shown in FIG. 5, each of the first rolling elements 15A rolls to contact the second rail-surface 11B. The first rolling elements 15A are arranged in a line along a direction parallel to the longitudinal direction of the second rail-surface 11B.

Each of the second rolling elements 15B rolls to contact the third rail-surface 11C. The second rolling elements 15B are arranged in a line along a direction parallel to the longitudinal direction of the third rail-surface 11C. In other words, two first rolling elements 15A and two second rolling elements 15B are respectively arranged in a line along the direction of extension.

Figure 7B:
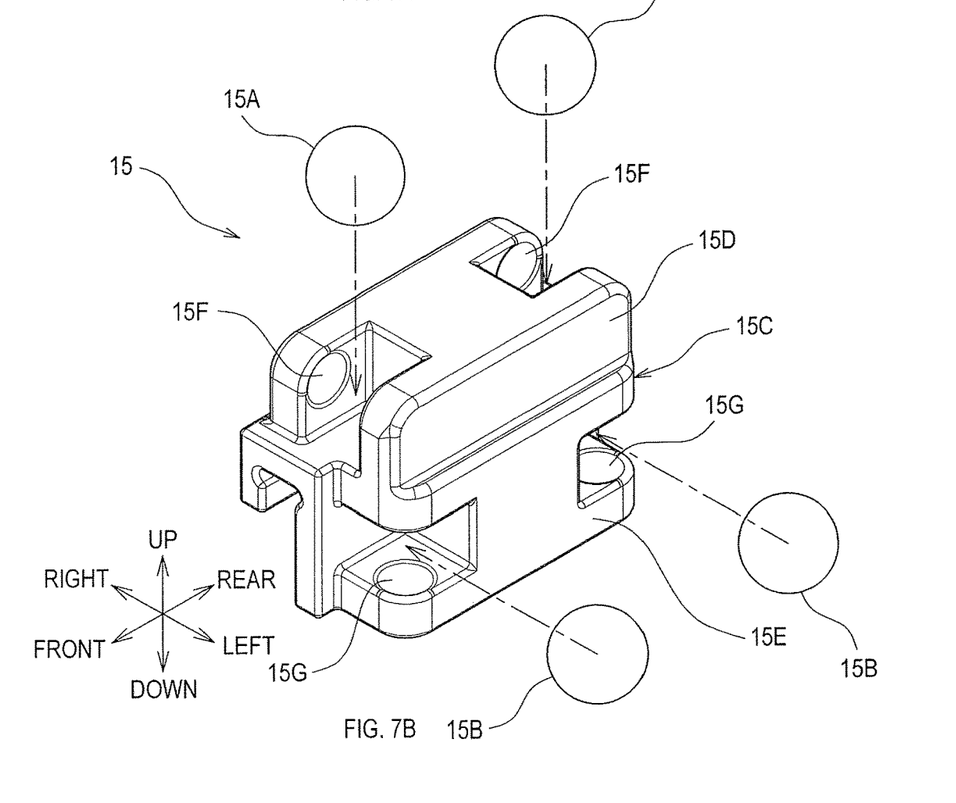
FIG. 7B is an exploded perspective view of the spherical rolling element according to the first embodiment.

As shown in FIG. 7B, the retainer 15C comprises a first retainer 15D and a second retainer 15E. The first retainer 15D is a member to press two first rolling elements 15A against the second rail-surface 11B while rotatably retaining the two first rolling elements 15A.

The second retainer 15E is a member to press two second rolling elements 15B against the third rail-surface 11C while rotatably retaining the two second rolling elements 15B. The first retainer 15D and the second retainer 15E may be made of resin or metal.

In the present embodiment, the first retainer 15D and the second retainer 15E are made of resin and integrally formed with each other. The retainer 15C is elastically deformed and thus exerts pressure forces to press the first rolling elements 15A and the second rolling elements 15B.

Portions 15F, and 15G of the retainer 15C, where the first rolling elements 15A and the second rolling elements 15B respectively have a sliding-contact with the retainer 15C, each comprise a spherical recess. In other words, each first rolling element 15A is provided with two portions 15F that have a sliding-contact with the first rolling element 15A (hereinafter the portion 15F is referred to as the first recess 15F).

As shown in FIG. 5, two first recesses 15F are separately disposed at both ends of the first rolling element 15A in the horizontal direction. Each second rolling element 15B are provided with two portions 15G that have a sliding-contact with the second rolling element 15B (hereinafter the portion 15G is referred to as the second recess 15G).

Two second recesses 15G are separately disposed at both ends of the second rolling element 15B in the vertical direction. In other words, two first recesses 15F and two second recesses 15G respectively interpose the first rolling element 15A and the second rolling element 15B in the directions orthogonal to the aforementioned pressure forces.

When a portion of the movable rail 12 that is on the opposite side of the third rail-surface 11C across the second rolling element 15B is called an opposite portion 12A, an imaginary horizontal line Lo that passes through the center of each second rolling element 15B is approximately orthogonal to the third rail-surface 11C and a surface (hereinafter referred to as an opposing surface) of the opposite portion 12A.

In other words, the opposing surface of the opposite portion 12A and the third rail-surface 11C face each other in the horizontal direction across the second rolling element 15B; and the opposing surface of the opposite portion 12A and the third rail-surface 11C are approximately parallel to each other.

Figure 3:
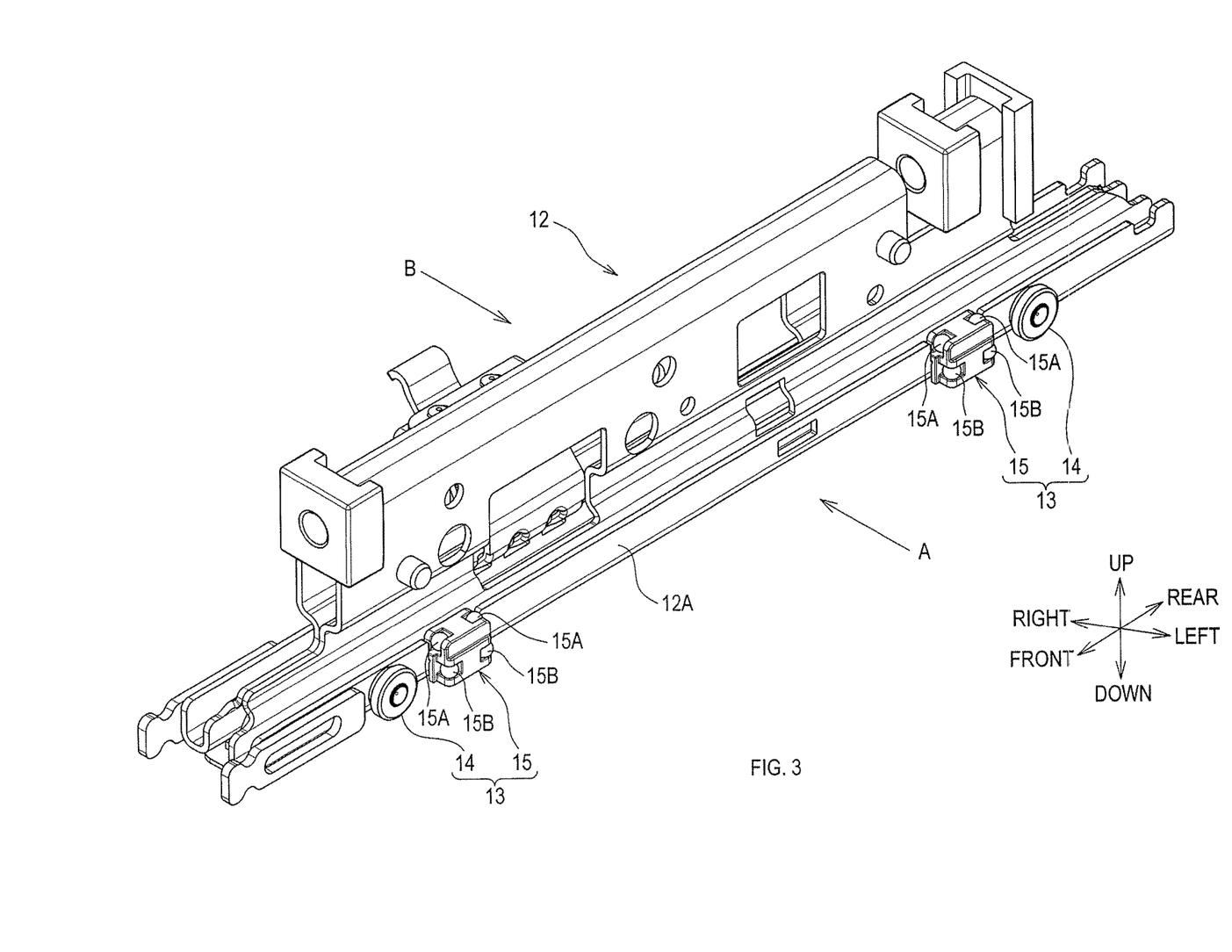
FIG. 3 is a perspective view showing a movable rail according to the first embodiment.

The retainer 15C is mounted on the movable rail 12 so as to horizontally interpose the opposite portion 12A therebetween; the position of the retainer 15C in the width direction is predetermined. The position of the retainer 15C in the direction of extension is also predetermined such that the retainer 15C is fit to a concave cut made on the opposite portion 12A as shown in FIG. 3.

2. Features of Seat Sliding Device in Present Embodiment

In the present embodiment, the rollers 14A and the first rolling elements 15A are displaced integrally with the movable rail 12 relative to the fixed rail 11. In other words, in the present embodiment, when the movable rail 12 is displaced by sliding towards the first end of the fixed rail 11 in the longitudinal direction, the rollers 14A and the first rolling elements 15A are not displaced by rolling towards the second end of the fixed rail 11 in the longitudinal direction relative to the movable rail 12.

Moreover, since the retainer 15C presses the first rolling elements 15A against the second rail-surface 11B, it is possible to reduce rattling of the movable rail 12 in the up-down direction relative to the fixed rail 11. Accordingly, a large slide stroke can be ensured in the present embodiment while rattling of the movable rail 12 in the up-down direction is reduced.

The retainer 15C presses the second rolling elements 15B, which roll to contact the third rail-surface 11C, against the third rail-surface 11C. A large slide stroke can thus be ensured while rattling of the movable rail 12 in the horizontal direction is also reduced.

The first rolling elements 15A and the second rolling elements 15B are respectively arranged in a line along a direction parallel to the longitudinal direction of the second rail-surface 11B and the third rail-surface 11C. This enables spreading a load to two or more rolling elements 15A, and 15B.

The imaginary horizontal line Lo that passes through the center of each second rolling element 15B is approximately orthogonal to the third rail-surface 11C and to the opposing surface of the opposite portion 12A. This assures that the fixed rail 11 can receive a load in the horizontal direction; therefore, it is ensured that rattling of the movable rail 12 in the horizontal direction can be reduced.

The first recesses 15F and the second recesses 15G of the retainer 15C, where the first rolling elements 15A and the second rolling elements 15B respectively have sliding-contact with the retainer 15C, each comprises a spherical recess. This enables smooth rolling of the first rolling elements 15A and the second rolling elements 15B.

Second Embodiment

Figure 8:
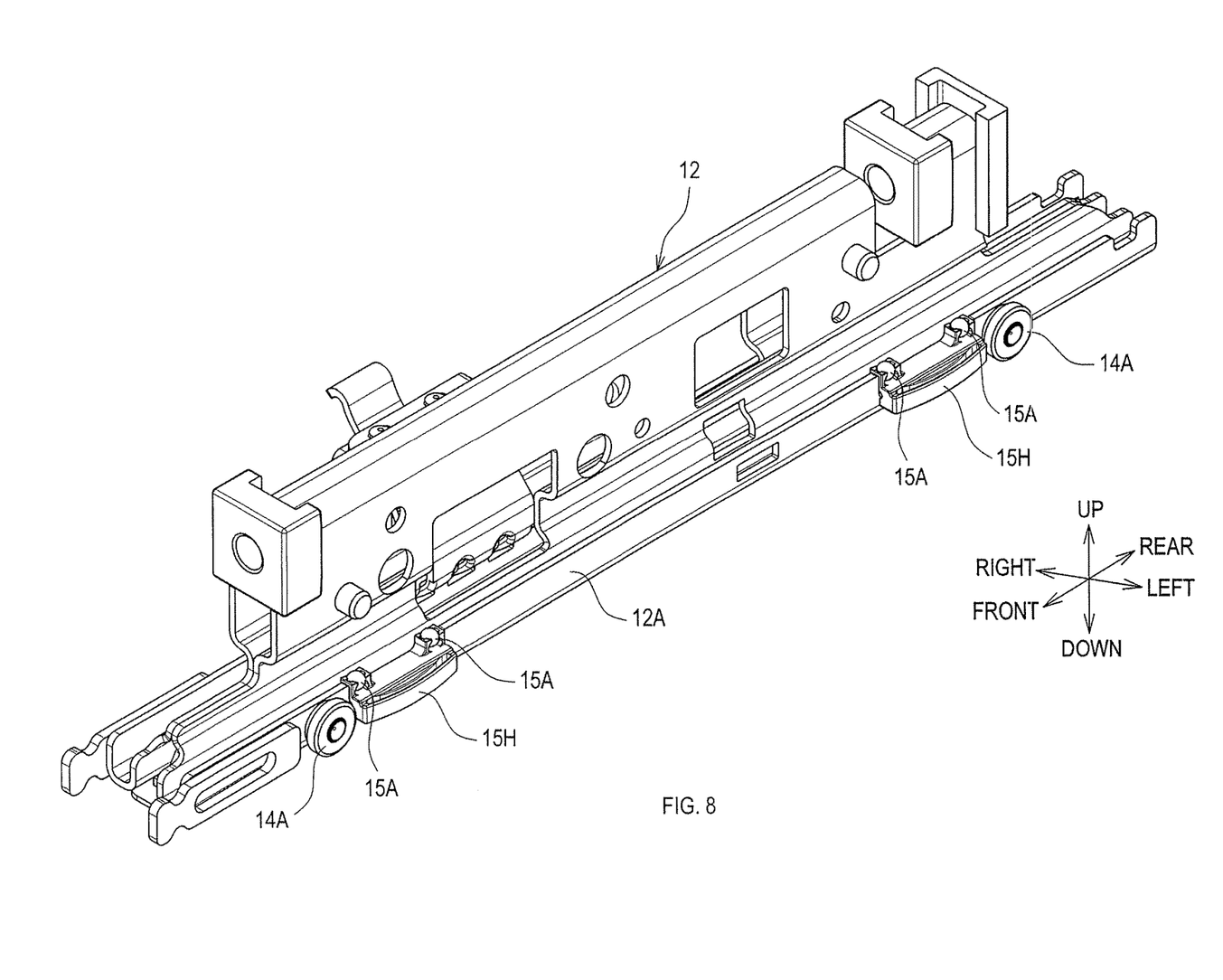
FIG. 8 is a perspective view showing a movable rail according to a second embodiment.

As shown in FIG. 8, the configuration according to the present embodiment comprises "a sliding-contact portion 15H, which has a sliding-contact with (hereinafter alternatively referred to as "sliding on") the third rail-surface 11C", in place of the second rolling elements 15B, so as to reduce rattling of the movable rail 12 in the horizontal direction.

Figure 9:
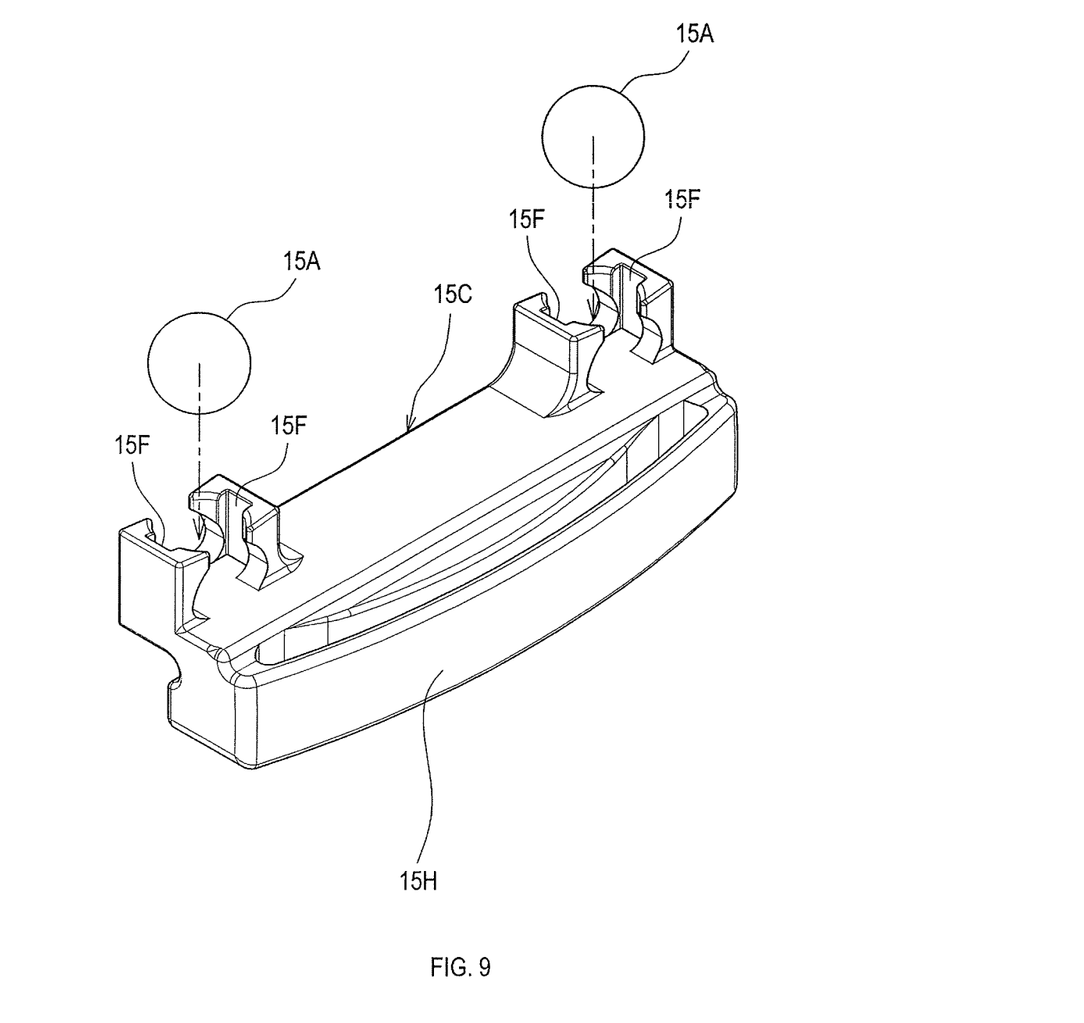
FIG. 9 is a perspective view of a spherical rolling element according to the second embodiment.

In other words, as shown in FIG. 9, the sliding-contact portion 15H is disposed on the retainer 15C at a position that faces the third rail-surface 11C. The sliding-contact portion 15H is in the form of a flat spring that curves outwardly towards the third rail-surface 11C.

Accordingly, the sliding-contact portion 15H and the third rail-surface 11C are in sliding-contact with each other with a predefined contact surface pressure, and thereby reduce rattling of the movable rail 12 in the horizontal direction. In the present embodiment, the sliding-contact portion 15H and the retainer 15C are made of resin and integrally formed with each other.

In the present embodiment, those constituent elements that are identical to the constituent elements in the aforementioned embodiment are labeled with the same reference numerals as in the aforementioned embodiment, and overlapping explanations thereof are omitted.

Other Embodiments

In the aforementioned embodiments, for example, the second rail-surface 11B may be vertically or horizontally displaced relative to the first rail-surface 11A.

In the aforementioned embodiment, the first retainer 15D and the second retainer 15E do not have to be integrally formed with each other.

In the aforementioned embodiments, for example, the third rail-surface 11C, and the second rolling elements 15B or the sliding-contact portion 15H may be omitted.

In the aforementioned embodiments, the imaginary horizontal line Lo that passes through the center of each second rolling element 15B does not have to be approximately orthogonal to the third rail-surface 11C and to the opposing surface of the opposite portion 12A.

In the aforementioned embodiment, for example, the sliding-contact portion 15H may be made of metal or resin as a separate component and assembled to the retainer 15C.

In the aforementioned embodiments, for example, on each or either one of the first and second end of the movable rail 12 in the width direction, the movable rail 12 may comprise the roller rolling element 14 on each of its first and second end in the direction of extension.

The aforementioned embodiments describes the seat sliding device according to the present invention installed for seats of a passenger car. However, utilization of the present disclosure is not limited thereto. The present disclosure can be utilized for seats of other automobiles as well as for seats of other conveyances such as railway vehicles, vessels, and aircrafts, or for built-in seats such as seats in theaters.

The present disclosure is not limited to the aforementioned embodiments as long as it falls within the spirit of the invention described in the claims. Accordingly, the present disclosure may be configured in combination of at least two of the above-described embodiments.

What is claimed is:

1. A seat sliding device that supports a seat so that the seat is slidable, the device comprising:
    a fixed rail that comprises a first rail-surface facing upward, and a second rail-surface facing downward;
    a movable rail that is configured to be slidable relative to the fixed rail and to support a seat;
    a roller that is rotatably mounted on the movable rail via a shaft, wherein the roller receives a downward load imposed on the movable rail and rolls to contact the first rail-surface;
    at least one first rolling element that is formed into a sphere and rolls to contact the second rail-surface; and
    a first retainer that is mounted on the movable rail, wherein the first retainer presses the at least one first rolling element against the second rail-surface while rotatably retaining the at least one first rolling element.

2. The seat sliding device according to claim 1, further comprising:
    a third rail-surface that is disposed on the fixed rail, wherein the third rail-surface is orthogonal to a horizontal direction of the seat sliding device;
    at least one second rolling element that is formed into a sphere and rolls to contact the third rail-surface; and
    a second retainer that is mounted on the movable rail, wherein the second retainer presses the at least one second rolling element against the third rail-surface while rotatably retaining the at least one second rolling element.

3. The seat sliding device according to claim 2, wherein the first retainer and the second retainer are integrally formed with each other.

4. The seat sliding device according to claim 1, wherein the at least one first rolling element comprises at least two first rolling elements,
    the first retainer retains the at least two first rolling elements, and
    the at least two first rolling elements are arranged in a line along a direction parallel to a longitudinal direction of the second rail-surface.

5. The seat sliding device according to claim 2, wherein an imaginary horizontal line that passes through a center of the at least one second rolling element is orthogonal to the third rail-surface and to a surface of the movable rail that faces the third rail-surface across the at least one second rolling element.

6. The seat sliding device according to claim 1, wherein a portion of the first retainer comprises a spherical recess in which the at least one first rolling element is disposed to have a sliding-contact with the first retainer.

7. The seat sliding device according to claim 1, wherein the at least one first rolling element is spaced from the roller in a longitudinal direction of the movable rail.

8. The seat sliding device according to claim 1, further comprising:
    a third rail-surface disposed on the fixed rail, the third rail-surface being orthogonal to a horizontal direction of the seat sliding device; and
    at least one second rolling element that is formed into a sphere, the at least one second rolling element being configured to have rolling contact only with the third rail-surface.

* * * * *